United States Patent
Pennline et al.

(10) Patent No.: US 8,500,854 B1
(45) Date of Patent: Aug. 6, 2013

(54) REGENERABLE SORBENT TECHNIQUE FOR CAPTURING $CO_2$ USING IMMOBILIZED AMINE SORBENTS

(75) Inventors: Henry W. Pennline, Bethel Park, PA (US); James S. Hoffman, South Park, PA (US); McMahan L. Gray, Pittsburgh, PA (US); Daniel J. Fauth, Pittsburgh, PA (US); Kevin P. Resnik, White Oak, PA (US)

(73) Assignee: U.S. Department of Energy, Washington, DC (US)

( * ) Notice: Subject to any disclaimer, the term of this patent is extended or adjusted under 35 U.S.C. 154(b) by 293 days.

(21) Appl. No.: 13/052,331

(22) Filed: Mar. 21, 2011

Related U.S. Application Data (60) Provisional application No. 61/315,506, filed on Mar. 19, 2010.

(51) Int. Cl.
*B01D 53/02* (2006.01)

(52) U.S. Cl.
USPC .................... 95/139; 95/117; 95/148; 95/126; 95/146

(58) Field of Classification Search
USPC ............... 95/107, 117, 139, 148; 96/126, 146
See application file for complete search history.

(56) References Cited

U.S. PATENT DOCUMENTS

| | | | | |
|---|---|---|---|---|
| 5,061,455 A | * | 10/1991 | Brose et al. | 96/122 |
| 6,547,854 B1 | * | 4/2003 | Gray et al. | 95/139 |
| 7,288,136 B1 | * | 10/2007 | Gray et al. | 95/139 |
| 7,452,406 B2 | * | 11/2008 | Little et al. | 95/97 |
| 7,708,806 B2 | * | 5/2010 | Wright et al. | 95/139 |
| 8,083,836 B2 | * | 12/2011 | Wright et al. | 95/139 |
| 8,163,066 B2 | * | 4/2012 | Eisenberger | 95/107 |
| 8,262,774 B2 | * | 9/2012 | Liu | 95/139 |
| 8,273,160 B2 | * | 9/2012 | Wright et al. | 96/4 |
| 2007/0169624 A1 | * | 7/2007 | Saito et al. | 95/139 |
| 2008/0289319 A1 | * | 11/2008 | Eisenberger et al. | 60/274 |
| 2008/0289495 A1 | * | 11/2008 | Eisenberger et al. | 95/107 |
| 2008/0289499 A1 | * | 11/2008 | Eisenberger et al. | 95/139 |
| 2008/0289500 A1 | * | 11/2008 | Eisenberger et al. | 95/139 |
| 2010/0105126 A1 | * | 4/2010 | Wright et al. | 435/257.1 |
| 2010/0263534 A1 | | 10/2010 | Chuang | |
| 2010/0292072 A1 | * | 11/2010 | Gray et al. | 502/56 |
| 2011/0041688 A1 | * | 2/2011 | Eisenberger | 95/107 |
| 2011/0088550 A1 | * | 4/2011 | Tirio | 95/96 |
| 2011/0189075 A1 | * | 8/2011 | Wright et al. | 423/437.1 |
| 2011/0203311 A1 | * | 8/2011 | Wright et al. | 62/602 |
| 2011/0296872 A1 | * | 12/2011 | Eisenberger | 62/640 |

FOREIGN PATENT DOCUMENTS

WO PCT/US2008/012570 5/2009

* cited by examiner

*Primary Examiner* — Christopher P Jones
(74) *Attorney, Agent, or Firm* — James B. Potts; Mark P. Dvorscak; John T. Lucas

(57) ABSTRACT

The disclosure provides a $CO_2$ absorption method using an amine-based solid sorbent for the removal of carbon dioxide from a gas stream. The method disclosed mitigates the impact of water loading on regeneration by utilizing a conditioner following the steam regeneration process, providing for a water loading on the amine-based solid sorbent following $CO_2$ absorption substantially equivalent to the moisture loading of the regeneration process. This assists in optimizing the $CO_2$ removal capacity of the amine-based solid sorbent for a given absorption and regeneration reactor size. Management of the water loading in this manner allows regeneration reactor operation with significant mitigation of energy losses incurred by the necessary desorption of adsorbed water.

20 Claims, 4 Drawing Sheets

REGENERABLE SORBENT TECHNIQUE FOR CAPTURING $CO_2$ USING IMMOBILIZED AMINE SORBENTS

RELATION TO OTHER APPLICATIONS

This patent application claims priority from provisional patent application 61/315,506 filed Mar. 19, 2010, and which is hereby incorporated by reference in its entirety.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The disclosure provides a $CO_2$ absorption method using an amine-based solid sorbent for the removal of carbon dioxide from a gas stream. The method disclosed mitigates the impact of water loading on regeneration by utilizing a conditioner following the steam regeneration process. In an embodiment, the method provides for a water loading following $CO_2$ absorption substantially equivalent to the moisture loading of the regeneration step. Management of the water loading allows regeneration reactor operation with significant mitigation of losses incurred by the necessary desorption of adsorbed water.

BACKGROUND

Carbon sequestration is a viable alternative to reduce the emissions of the greenhouse gas carbon dioxide ($CO_2$) from large point sources. It holds the potential to provide deep reductions in greenhouse gas emissions. Carbon sequestration is a two-step process where the capture of carbon dioxide from a gas stream is followed by permanent storage. The capture step for carbon dioxide represents a major cost in the overall process.

Of particular interest are power generation point sources that use fossil fuels. Since nearly one-third of the anthropogenic $CO_2$ emissions are produced by these facilities, conventional coal-burning power plants and advanced power generation plants—such as integrated gasification combined cycle—present opportunities where carbon can be removed and then permanently stored. At the current time, pulverized coal-fired-base steam cycles have been the predominant electric power generation technology. These will continue to be used predominantly in the near future. Technologies for capturing $CO_2$ will need to be applied to new more efficient coal-fired facilities and will need to be retrofitted onto existing plants.

For coal-fired power plants, the conventional scrubbing system that is currently the comparative baseline for all other capture technologies is monoethanolamine (MEA) scrubbing. This wet scrubbing process removes the $CO_2$ in an absorber and then regenerates the spent scrubbing liquor in a vessel by indirectly heating the solution with plant steam. Although there have been large scale commercial demonstrations of this technology, the process has several disadvantages, such as a high heat of reaction, low working capacity, corrosiveness of the solution, the susceptibility of being poisoned, and most notably, its need to be in an aqueous solution. This latter disadvantage results in a large energy need to regenerate the spent solution, especially the sensible heating of the water, which is a minimum of 70-wt % of the solution. The water is recognized as an inert carrier between the absorption and regeneration steps. Another energy loss while regenerating the spent MEA solution includes evaporative heat loss of vaporizing liquid water.

One type of novel $CO_2$ capture technology that can be applied to various gas streams has, as a basis, dry regenerable solid sorbents. Examples of these types of sorbents are zeolites, activated carbon, alkali/alkaline earth metals, immobilized amines, metal organic framework, etc. A specific sorbent class that shows significant advancement are amine-based solid sorbents, such as Basic Immobilized Amine Sorbents (BIAS). These sorbents consist of amines (primary, secondary, tertiary, or a combination thereof) deposited onto a porous substrate. The manner of deposition is important and can be random or structured deposition of the amine onto the support (silica, polymer, etc.) The sorbent process may act in a similar fashion to the wet scrubbing in that the sorbent would be transported between the absorption step and the regeneration step and in that the sorbent is regenerated by a temperature-swing application.

One of the main benefits in using the solid sorbent is the elimination of the sensible heat for the liquid water as compared to MEA. A secondary benefit lies in the lower heat capacity for the solid versus the liquid solvent, also serving to lower the sensible heat required. More $CO_2$ can be absorbed on a weight or volume basis with the amine-based solid sorbents, so the sorbent system is capable of a significant decrease in the heat duty for the regeneration step. A lower cost of energy service as compared to amine wet scrubbing may also result. Thus amine-based solid sorbents have the capability to improve the overall energetics of $CO_2$ capture.

Effective amine-based solid sorbent methodologies are needed for carbon dioxide capture, whether the capture occurs in combustion or gasification power generation systems, or in other applications, such as natural gas cleanup. Because of the high concentration of carbon dioxide in any of these feed streams, a large quantity of the gas will be reacting with the sorbent and thus produce considerable amounts of exothermic heat. This heat must be removed from the sorbent to prevent temperature instability within the reactor, to assure the sorbent will operate at optimum temperature, and to eliminate the potential degradation of the sorbent because of high temperature excursions. Reactor designs are available to eliminate heat problems. However, the presence of moisture in the various process gas streams can have a tremendous impact on the energetics of the system. Indirect/direct steam regeneration will have a significant advantage in the regeneration step with respect to $CO_2$ regeneration, and adsorption/desorption as related to water within the process steps will potentially represent an energy loss unless controlled. It would be advantageous to provide a methodology whereby the CO2 absorption and water adsorption of amine-based solid sorbents were effectively compensated for, and regeneration energy losses mitigated.

Methodologies utilizing selected amine-based solid sorbents have discussed steam regeneration and subsequent air drying of the amine-based solid sorbent in a cyclic process. Typically the methodologies have relied on a stationary reactor where the sorbent does not floe between adsorption and regeneration steps. See e.g., U.S. patent application Ser. No. 12/741,600, filed by Chuang, based on PCT/US08/12570 filed Nov. 7, 2008. These methodologies discuss the use of dry air to evacuate steam following regeneration, however they do not address water loading manipulations based on inherent absorption and desorption behavior of the sorbent.

Such an approach where subsequent water loading behaviors during the cyclic processes are ignored, and where a dry air flow is specified solely for the evacuation of surrounding steam, can lead to the significant transfer of adsorbed water from an absorber to a regenerator. Such transfer can produce significant regeneration losses and reduction in the $CO_2$ capacity of a sorbent.

It would be advantageous to provide a method of adsorbing $CO_2$ using an amine-based solid sorbent where regeneration losses and $CO_2$ capacity reductions could be mitigated through proper adsorbed water management during the process, by considering the manner in which $H_2O$ and $CO_2$ respectively are sorbed and desorbed during a cyclic process. Such a process would allow for vessels sized to achieve acceptable $CO_2$ absorption and regeneration loads to be optimized through the water management. The process should provide for integration with existing power or fuel production facilities, and should be applicable to temperature and pressure ranges which avoid oxidative degradation of the amine-based solid sorbent while minimizing energy and infrastructure requirements.

Accordingly, it is an object of this disclosure to provide a method of adsorbing $CO_2$ using an amine-based solid sorbent whereby regeneration losses and $CO_2$ capacity reductions are mitigated through proper adsorbed water management during the cyclic process.

Further, it is an object of this disclosure to provide a method of adsorbing $CO_2$ using an amine-based solid sorbent whereby the manner in which $H_2O$ and $CO_2$ are sorbed and desorbed, so that vessels sized to achieve acceptable $CO_2$ absorption and regeneration loads can be optimized through the water management.

Further, it is an object of this disclosure to provide a method of adsorbing $CO_2$ using an amine-based solid sorbent whereby substantially equalized absorber and regenerator moisture loadings may result, so that the thermal energy in a steam regeneration process is applied maximally to $CO_2$ desorption, without the necessity for desorbing $H_2O$ adsorbed in the $CO_2$ absorption process.

Further, it is an object of this disclosure to provide a method of adsorbing $CO_2$ using an amine-based solid sorbent where the method can be integrated with existing power or fuel production facilities, in order to provide a relatively pure $CO_2$ stream for subsequent sequestration or utilization.

Further, it is an object of this disclosure to provide a method of adsorbing $CO_2$ using an amine-based solid sorbent where the methodology can be applied to temperature and pressure ranges avoiding oxidative degeneration of the amine-based solid sorbent while minimizing energy and infrastructure impacts.

These and other objects, aspects, and advantages of the present disclosure will become better understood with reference to the accompanying description and claims.

SUMMARY

The disclosure describes a $CO_2$ absorption method using an amine-based solid sorbent for the removal of carbon dioxide from a gas stream, and further describes regeneration of the amine-based solid sorbent to form a pure concentrated stream of $CO_2$. The amine-based solid sorbent is a solid substrate supporting an amine functional group on its surface. For example, the amine-based solid sorbent may be comprised of primary, secondary, or tertiary amines, or a combination thereof, deposited onto a porous substrate.

A key chemical property of the amine-based sorbent is its affinity to adsorb moisture. The amine-based solid sorbents may adsorb moisture present in a gaseous stream outside of the water vapor that directly reacts with $CO_2$ and amine as part of the $CO_2$ chemical reaction. This particular adsorbed water is retained on the sorbent following $CO_2$ absorption operations, and the adsorbed water can negatively impact the energetics of a subsequent steam regeneration process.

The amine-based solid sorbent is exposed to a gaseous stream and absorbs $CO_2$ and adsorbs $H_2O$ outside of the $CO_2$ absorption reaction. Generally, $CO_2$ absorption on the amine-based solid sorbent occurs faster than the adsorption of adsorbed water. As a result, in processes intended for the absorption of $CO_2$ and tailored to achieve a given $CO_2$ loading, the amount of water adsorbed during the $CO_2$ absorption process is less than the equilibrium water loading that might be achieved under the same conditions, were the amine-based solid sorbent allowed sufficient time to equilibrate. In contrast, during the regeneration process, $CO_2$ desorption on the amine-based solid sorbent can occur more slowly than the desorption of adsorbed water. These tendencies combined with the relative equilibrium water loadings of the amine-based solid sorbent during the respective steps can result in the water loading of the sorbent following $CO_2$ absorption exceeding the equilibrium water loading of the sorbent during the regeneration process. A substantial portion of the energy supplied by the regeneration reactor is then expended in the removal of some portion of the water loading, rather than $CO_2$ desorption. Further, upon exit from a steam regeneration process, the regenerated sorbent solids may be substantially surrounded by free steam as a result of particle morphology, entrainment, or some other reason. Condensation of this free steam on the regenerated sorbent will lead to sorbent performance losses.

The method disclosed mitigates the impact of water loading on regeneration by utilizing a conditioner following the steam regeneration step. The conditioner receives a flow of drying gas which contacts the regenerated sorbent and removes the free steam, as well as reducing the water loading of the regenerated sorbent by removing some portion of the adsorbed water present. In an embodiment, the adsorbed water removed by the conditioner is substantially equivalent to the water uptake expected to occur during the subsequent $CO_2$ absorption process. This provides for a water loadings on the amine-based solid sorbent substantially equivalent to the moisture loading of the regeneration process, allowing the thermal energy transferred to the loaded sorbent to be utilized for $CO_2$ desorption rather than the desorption of adsorbed water. This assists in optimizing the $CO_2$ removal capacity of the amine-based solid sorbent for a given absorption and regeneration reactor size. Management of the water loading in this manner allows regeneration reactor operation with significant mitigation of energy losses incurred by the necessary desorption of adsorbed water.

The novel process and principles of operation are further discussed in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method of adsorbing $CO_2$ using an amine-based solid sorbent whereby regeneration energy losses and $CO_2$ capacity reductions are mitigated through proper adsorbed water management during the cyclic process.

The disclosure describes a $CO_2$ absorption method using an amine-based solid sorbent for the removal of carbon dioxide from a gas stream, and further describes regeneration of the amine-based solid sorbent to form a pure concentrated stream of $CO_2$. The amine-based solid sorbent is a solid substrate supporting an amine functional group on its surface. For example, the amine-based solid sorbent may be comprised of primary, secondary, or tertiary amines, or a combination thereof, deposited onto a porous substrate. Such amine-based solid sorbents are known in the art. See e.g., U.S. Pat. No. 7,288,136 to Gray et al., issued Oct. 30, 2007, among others. The method disclosed is attractive with respect to the overall energetics of the capture system.

A key chemical property of the amine-based sorbent is its affinity to adsorb moisture. The amine-based solid sorbents may adsorb moisture present in a gaseous stream outside of the water vapor that directly reacts with $CO_2$ and amine as part of the $CO_2$ chemical reaction. This particular adsorbed water is retained on the sorbent following $CO_2$ absorption operations, and the adsorbed water can negatively impact the energetics of a subsequent steam regeneration process, particularly when water loading on the sorbent following $CO_2$ absorption exceeds the water loading on the sorbent following sorbent regeneration. The manner of water adsorption on the amine-based sorbent and the management of adsorbed water for the improvement of regeneration energetics are particularly addressed in this disclosure.

Within this disclosure, the term "amine-based solid sorbent" means a solid substrate supporting an amine functional group on its surface, for example, a sorbent comprised of primary, secondary, or tertiary amines, or a combination thereof, deposited onto a porous substrate. Such amine-based solid sorbents are known in the art. See e.g., U.S. Pat. No. 7,288,136 to Gray, among others.

Within this disclosure, the term "adsorbed water" means water adsorbed or absorbed on the amine-based solid sorbent, but which does not participate in a reaction with $CO_2$ and amine as part of the $CO_2$ chemical reaction generating $CO_2$ absorption by the amine-based solid sorbent.

Within this disclosure, the term "free steam" means vapor comprised of $H_2O$ and substantially surrounding an amine-based solid sorbent following a steam regeneration of the amine-based solid sorbent, where the $H_2O$ comprising the vapor is not adsorbed or absorbed on a surface of the amine-based solid sorbent.

Within this disclosure, the term "water loading" refers to the mass of adsorbed water adsorbed on the amine-based solid sorbent, for example, mol $H_2O$ per kilogram of amine-based solid sorbent. It is understood that at any given time under a set of thermodynamic conditions, the mass of adsorbed water may contain individual adsorbed water molecules undergoing adsorption or desorption. However, when this disclosure refers to or compares water loading between various points in the method, this refers to a collective mass of adsorbed water rather than the behavior of individual adsorbed water molecules comprising the mass.

Within this disclosure, the term "first temperature" may be a mean value around which variation occurs as a result of operational constraints. The acceptable magnitude of variation of the first temperature depends on the specified relationship of the first temperature to subsequent temperatures as specified in the exemplary methods. Thus, when the exemplary methods specify maintaining a first temperature, it is understood that this is intended to indicate maintaining the parameter within the acceptable magnitude of variation about the mean value such that the specified relationship to subsequent temperatures is observed. Similar definition applies to similar terms, such as "second temperature" and "third temperature," when such terms are used in this disclosure.

Within this disclosure, the term "indirect" when applied to heat exchange means a process of heat transfer from a heat containing medium to a heat absorbing medium without direct contact between the two media involved. For example, heat transfer from steam to a sorbent through a heat exchanger tube separating the steam and the sorbent.

The management of adsorbed water disclosed herein stems from a recognition of the manner in which $H_2O$ and $CO_2$ respectively sorb and desorb from the amine-based solid sorbent. The disclosure utilizes this recognition in a novel way to mitigate regeneration energy losses that arise from the desorption of the adsorbed water, since such losses raise the regeneration heat duty and increase separation costs. The disclosure recognizes that in a cycling $CO_2$ absorption operation using the amine-based solid sorbents, $CO_2$ absorption may generally occur at a faster rate than water adsorption in the $CO_2$ absorption process, while $CO_2$ desorption may generally occur at a slower rate than adsorbed water desorption during the amine-based solid sorbent regeneration. Because vessels used in an actual process will typically be sized to achieve acceptable $CO_2$ absorption and regeneration loads, in the absence of manipulating the adsorbed water loadings between the absorber and regenerator, the amine-based solid sorbent could achieve an adsorbed water loading during the $CO_2$ absorption process beyond the loading supported by the conditions of the regeneration process, leading to regeneration losses as regeneration thermal energy is necessarily expended to reduce the adsorbed water loading. Such a loss is to be avoided since it will increase regeneration heat duty.

This disclosure utilizes a conditioning step following regeneration of the amine-based solid sorbent in order to mitigate any such moisture loading imbalances. A heated gas such as air is passed through the amine-based solid sorbent to purge any free steam surrounding the sorbent in order to avoid condensation, and additionally reduces the adsorbed water on the amine-based solid sorbent, so that subsequent water uptake experienced during a subsequent absorption process maintains water loading equivalent to or below the level supported by the conditions of the regeneration process. Experimental results indicate that the moisture can be released under an inert gas flow even without a temperature swing, suggesting that the moisture is weakly bonded. In an embodiment, the conditioning step establishes a water loading on the amine-based solid sorbent such that any additional water loading during a subsequent $CO_2$ absorption process generates an exit water loading generally matching the regenerator water loading. This approach mitigates regeneration losses by avoiding thermal requirements for additional desorption of moisture.

Figure 1:
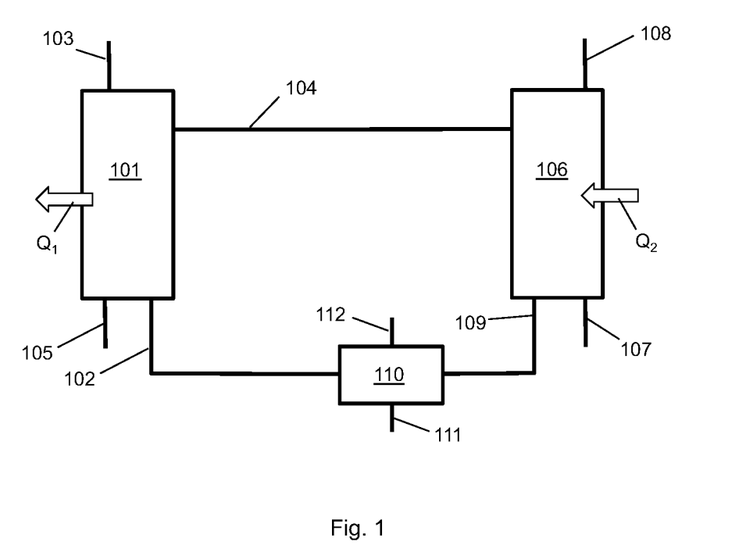
FIG. 1 illustrates an embodiment of the method disclosed herein.

A basic embodiment of the $CO_2$ absorption/regeneration method using an amine-based solid sorbent is illustrated with reference to FIG. 1. FIG. 1 depicts an absorption reactor 101 receiving an amine-based solid sorbent at 102 and a gaseous stream comprised of $CO_2$, $H_2O$ and other components at 103. Absorption reactor 101 is at a first temperature where the amine-based solid sorbent would be expected to absorb gaseous $CO_2$ based on known properties of the sorbent. Within absorption reactor 101, the amine-based solid sorbent is exposed to the gaseous stream in absorption reactor 101, and the amine-based solid sorbent absorbs $CO_2$ in a reaction with $CO_2$, amine, and $H_2O$, and further adsorbs $H_2O$ from the gaseous stream as adsorbed water, where the adsorbed water is incidental to the $CO_2$ chemical reaction generating $CO_2$ absorption, as earlier defined. Concurrently, heat transfer $Q_1$ from absorption reactor 101 occurs as necessary to substantially maintain absorption reactor 101 at the first temperature. An exhaust stream comprised of the gaseous stream less the $CO_2$ and $H_2O$ removed by interaction with the amine-based solid sorbent exits absorption reactor 101 at 105.

The amine-based solid sorbent at 102 enters absorption reactor 101 with an initial water loading of adsorbed water, and during exposure to the gaseous stream in absorption reactor 101 further increases its water loading by an adsorption amount. Following the exposure, a loaded sorbent exits absorption reactor 101 at 104. The loaded sorbent is comprised of $CO_2$ absorbed in absorption reactor 101, the adsorption amount of water adsorbed in absorption reactor 101, and the initial water loading present when the amine-based solid sorbent entered absorption reactor 101.

As will be discussed infra, $CO_2$ absorption on the amine-based solid sorbent occurs faster than the adsorption of adsorbed water. Additionally, it is understood that the amount of $CO_2$ absorbed and the degree of water loading experienced in absorption reactor 101 is a function of the both the thermodynamic conditions within adsorption reactor 101 and a residence time, where the residence time is the elapsed time that the amine-based solid sorbent is exposed to the thermodynamic conditions. Under a typical process operation intended for the absorption of $CO_2$, the residence time will be tailored to achieve a given $CO_2$ loading. Because of the relative $CO_2$ and $H_2O$ sorption rates, the adsorption amount of water adsorbed in absorption reactor 101 over the residence time is expected to be less than the equilibrium water loading that might be achieved under the same conditions, were the amine-based solid sorbent allowed sufficient time to equilibrate with respect to water in absorption reactor 101.

At FIG. 1, the loaded sorbent exiting at 104 is transferred to regeneration reactor 106. Regeneration reactor 106 receives the loaded sorbent and further receives a flow of regeneration steam at 107. The regeneration steam is at a second temperature greater than the first temperature of the loaded sorbent, and is typically slightly superheated. As a result, when the regeneration steam contacts the loaded sorbent in regeneration reactor 106, the regeneration steam increases the temperature of the loaded sorbent above the first temperature, to a third temperature, which may be substantially equivalent to the second temperature. The third temperature reduces the $CO_2$ capacity of the amine-based solid sorbent and $CO_2$ desorbs. The regeneration steam also acts to sweep the desorbed $CO_2$ from regeneration reactor 106 and thereby maintain a relatively low $CO_2$ partial pressure above the loaded sorbent. A $CO_2$ stream comprised of the desorbed $CO_2$ and $H_2O$ from the regeneration stream exits at 108.

An indirect heating mechanism may also be utilized in conjunction with steam regeneration to increase the temperature of the loaded sorbent to the higher second temperature. Further, heat transfer $Q_2$ to regeneration reactor 106 may occur as necessary to substantially maintain regeneration reactor 106 at the second temperature. Additionally, in lieu of direct steam in the regeneration step, an organic or in organic vapor could be used. It would need to be condensable in the cooling step for the regenerator off-gas after the regenerator, be inert with respect to $CO_2$ capture and the amine, and be available for multiple continuous cycles within the regeneration process. Losses of this sweep vapor would need to be negligible.

As will be discussed, and contrary to the absorption and adsorption rates within absorption reactor 101, $CO_2$ desorption of absorbed $CO_2$ from the loaded sorbent occurs more slowly than the desorption of adsorbed water within regeneration reactor 106. However—similar to the sizing rationale for absorption reactor 101—under a typical process operation intended for the absorption/desorption of $CO_2$, the residence time during the regeneration will be tailored to achieve a given $CO_2$ desorption. As a result of the typical sizing and the relative desorption rates, the adsorbed water on the amine-based solid sorbent will more closely approach and may achieve the equilibrium water loading value for the thermodynamic conditions present in regeneration reactor 106.

As will be discussed infra, the equilibrium water loading of the amine-based solid sorbent utilized in the cycle depicted at FIG. 1 is highly sensitive to both the temperature and the partial pressure of water vapor in a given set of thermodynamic conditions. As a result, generally speaking, the lower temperature within absorption reactor 101 produces a higher equilibrium water loading than the higher temperature within regeneration reactor 106, even though the partial pressure of water vapor in regeneration reactor 106 is increased. As a result, in a system consisting of only an absorption reactor and a regeneration reactor with sorbent being continuously transported between them and operating under similar circumstances and after some amount of cycles, the water loading of the sorbent exiting the absorption reactor will exceed the water loading of the sorbent present in the regeneration reactor. A substantial portion of the energy supplied by the regeneration reactor is then expended in the removal of some portion of the water loading, rather than $CO_2$ desorption. In such a case, either the regeneration reactor must be larger and supply more energy than would otherwise be required if the sorbent entered at substantially the regeneration equilibrium water loading, or the working $CO_2$ capacity of the sorbent suffers, because some portion of the regeneration thermal energy is repeatedly devoted to the removal of adsorbed water, rather than $CO_2$ desorption.

Typically condensation within the regenerator reactor is mitigated through the use of slightly superheated direct regeneration steam, as earlier described. When the sorbent exits the regeneration environment, condensation is mitigated through the use of conditioning.

At FIG. 1, regenerated sorbent exits regeneration reactor 106 at 109. As discussed, the regenerated sorbent has undergone $CO_2$ desorption via steam regeneration, and as a result of particle morphology, entrainment, or some other reason, the regenerated sorbent solids may be substantially surrounded by free steam, where the free steam is vapor comprised of $H_2O$ that is not adsorbed or absorbed on the surface of the regenerated sorbent, as earlier defined. Without removal, the free steam may condense on the regenerated sorbent as the regenerated sorbent temperature is decreased back down to absorption temperatures, potentially degrading the performance of the amine-based solid sorbent. In order to mitigate this condensation, the regenerated sorbent enters conditioner 110. Conditioner 110 receives a flow of a drying gas at 111 which contacts the regenerated sorbent and displaces the free steam, and the drying gas and the free steam exit conditioner 110 at 112. In an embodiment, the drying gas is air.

A further and significant function of conditioner 110 is to reduce the water loading of the regenerated sorbent, by removing some portion of the adsorbed water present on the regenerated sorbent that results from the thermodynamic conditions experienced during the steam regeneration. In an embodiment, the adsorbed water removed by conditioner 110 is substantially equivalent to the water uptake expected to occur during the subsequent $CO_2$ absorption process, given the thermodynamic conditions in absorption reactor 101, the moisture loading within regeneration reactor 106, and the respective residence times in each reactor. In such a situation, the moisture loading of the loaded sorbent exiting absorption reactor 101 and entering regeneration reactor 106 is substantially equivalent to the moisture loading for the conditions within regeneration reactor 106. This allows the thermal energy transferred for regeneration to the loaded sorbent to be utilized for $CO_2$ desorption rather than the desorption of adsorbed water, and the $CO_2$ removal capacity of the sorbent may be optimized for a given regeneration reactor size.

With reference to FIG. 1, and as discussed earlier, when the amine-based solid sorbent undergoes $CO_2$ absorption in absorption reactor 101, the amine-based solid sorbent adsorbs $CO_2$, and further adsorbs $H_2O$, increasing its water loading by an adsorption amount. At FIG. 1, conditioner 110 both removes free steam surrounding the regenerated sorbent, and further provides drying to remove an amount of adsorbed water substantially equivalent to the adsorption amount, producing a conditioned sorbent having a conditioned water loading. As a result, the water loading of the loaded sorbent exiting absorption reactor 101 and entering regeneration reactor 106 is substantially equivalent to the moisture loading for the conditions within regeneration reactor 106. The conditioned sorbent is then cooled and enters absorption reactor 101 for subsequent $CO_2$ absorption in the cyclic process. Management of the water loading in this manner allows regeneration reactor 106 operation with significant mitigation of energy losses incurred by the necessary desorption of adsorbed water.

In an integrated type of operation, the steam regeneration within regeneration reactor 106 will typically be a parasitic load on steam generated by a power island for the purpose of power generation. The water management process disclosed here serves to reduce this parasitic loading by substantially alleviating the burden of adsorbed water removal during the steam regeneration process. Further, the operation of the conditioner to reduce water loading by an amount substantially equivalent to the adsorption amount uptaken in the absorption reactor, rather than an essentially complete adsorbed water removal, reduces parasitic loading requirements stemming from conditioner 110. Additionally, a complete drying operation within conditioner 110 could result in loaded sorbent entering regeneration reactor 106 at a water loading below the equilibrium water loading of regeneration reactor 106, creating an additional steam load as some portion of the regeneration steam goes toward attempting to establish equilibrium moisture conditions.

Principles of Operation

The novel disclosure herein provides for management of adsorbed water based on a recognition of the manner in which $H_2O$ and $CO_2$ respectively sorb and desorb from the amine-based solid sorbent. The disclosure recognizes that in a cycling $CO_2$ absorption operation using the amine-based solid sorbents, $CO_2$ absorption may generally occur at a faster rate than water adsorption in the $CO_2$ absorption process, while $CO_2$ desorption may generally occur at a slower rate than adsorbed water desorption during the amine-based solid sorbent regeneration. Because vessels used in an actual process will typically be sized to achieve acceptable $CO_2$ absorption and regeneration loads, the adsorbed water loadings may lead to regeneration energy losses. Such loss increases regeneration heat duty and should be avoided.

Table 1 shows the results of testing conducted in a small packed bed reactor containing a one-gram sample of an amine-based solid sorbent. The amine-based solid sorbents evaluated were comprised of polyethylenimine (PEI) supported on a polymethylmethacrylate (PMMA) substrate, and PEI supported on a silica substrate. The testing involved an absorption step in which a stream of $CO_2$ and $H_2O$ in helium or a stream of $CO_2$ or $H_2O$ individually in helium flowed over the amine-based solid sorbent until the outlet $CO_2$ and $H_2O$ concentrations equaled the inlet feed $CO_2$ and $H_2O$ concentrations. A mass spectrometer on the gas exit detected changes in gas composition with time. The sorbent was regenerated in two steps. The initial step was sweeping the reactor system at the temperature of absorption with helium for a period of time, typically one hour. This was followed by ramping the temperature to 105° C. under helium flow until no $CO_2$ or $H_2O$ was emitted.

From the absorption tests with PEI/PMMA, Table 1 indicates that the PMMA substrate is relatively inert with respect to $CO_2$ absorption but will adsorb some moisture. The $CO_2$ capacity and especially the $H_2O$ capacity of the PEI/PMMA sorbent decrease with an increase in temperature. Note that 60° C. is near the typical temperature of the saturated flue gas after a flue gas desulfurization (FGD) unit. At a particular temperature, the higher the moisture content of the inlet gas (16.5% is near the 15% expected after a wet scrubber) the more the adsorbed moisture. Hence the equilibrium moisture loading is highly sensitive to both absorption temperature and partial pressure of water vapor. Additionally, it can be further concluded that, unlike $CO_2$, most of the moisture was removed in the first step of sweeping with helium, suggesting that the moisture may be adsorbed on the sorbent more weakly than the $CO_2$. Material balances between the absorption and regeneration steps were very close with respect to $CO_2$ and $H_2O$ closure.

Capacity results of the PEI/silica are somewhat different when compared with the PEI/PMMA results. At similar inlet gas compositions of $CO_2$ and $H_2O$, the $CO_2$ capacity and the $H_2O$ capacity of the PEI/silica are greater than the PEI/PMMA results. Within the PEI/silica matrix of testing, as the moisture vapor composition increases (7.7 versus 17.1%) the sorbent capacity for $H_2O$ also increases (9.6 versus 28.7 mol/kg sorbent). If the sorbent is run with moisture only in the helium carrier at 16.5%, the $H_2O$ loading on the sorbent is 34.8, which is similar to the 28.7 mol/kg sorbent, indicating that a significant amount of moisture can be absorbed onto the PEI/silica sorbent at water vapor conditions mimicking those found after the FGD unit in a power plant application. Although pure steam was not used in the testing, the one condition of 90% water vapor in helium at 105° C. approaches that of steam regeneration in the sorbent process. Even though the partial pressure of $H_2O$ is great in this case, the loading is still lower than the 16.5% moisture case at 60° C. (14.7 versus 34.8 mol/kg sorbent) most likely due to the temperature effect. As discussed, with steam regeneration, an ideal situation would be that the loaded sorbent after an absorption operation should contain the same moisture loading as the regenerated sorbent after regeneration.

As discussed, the regeneration step is critical with respect to parasitic power requirements. The regeneration of an amine-based solid sorbent is directly related not only to the $CO_2$ working capacity of the sorbent but also to the moisture content of the surrounding gases. The minimum heat duty of regeneration includes the $CO_2$ heat of reaction as well as the sensible heat to raise the sorbent from absorption to regeneration temperature. If moisture is adsorbed on the sorbent, this also needs to be considered in the heat duty calculation.

In a continuous sorbent flow system where sorbent is transported between an absorber and regenerator, the regenerative heat duty can be broken into several terms: the heat associated with heating the sorbent; the enthalpy change of the $CO_2$ from absorption conditions to regeneration conditions; the heat of reaction of $CO_2$ and the amine; the enthalpy change of any moisture on the sorbent; and the heat of reaction between the sorbent and adsorbed moisture. The latter two terms have typically been disregarded, however these two terms may increase the parasitic energy needs for the system. Additionally, with sorbents that will be regenerated under a sweep of steam, moisture considerations must be defined with respect to the energetics (regenerative heat duty).

The flow of gas through the regenerator is also a key factor. Ideally, the sweep of gas across the regenerator should be $CO_2$, so that the gas emitted from the regenerator could be pure $CO_2$. However, two issues may impact this type of regeneration. One is that if moisture in the absorption step is adsorbed onto the sorbent, it may be emitted during regeneration under $CO_2$ sweep and thus a stream of $CO_2$ and $H_2O$ would be emitted. The $H_2O$ could be condensed by cooling the stream, leaving pure $CO_2$ to be further sequestered. However, desorption of $H_2O$ from the sorbent during regeneration impacts the regenerative heat duty negatively due to the desorption heat of reaction of $H_2O$. Second, in the regenerator, the partial pressure of $CO_2$ will be great and the sorbent will be reluctant to release the $CO_2$. Thus a higher temperature is required for the regeneration in the presence of higher $CO_2$ partial pressure using $CO_2$ as a sweep gas. This higher temperature not only would increase the sensible energy and therefore heat duty of regeneration, but may also have a deleterious impact on the stability of the sorbent resulting in potential vaporization of the amine and/or decomposition of the sorbent. As a result, regeneration with direct steam by itself or in combination with indirect steam heating may be more appropriate to lower the partial pressure of $CO_2$ over the sorbent during regeneration, thus lowering the lean $CO_2$ loading and therefore raising the $CO_2$ working capacity.

Figure 2:
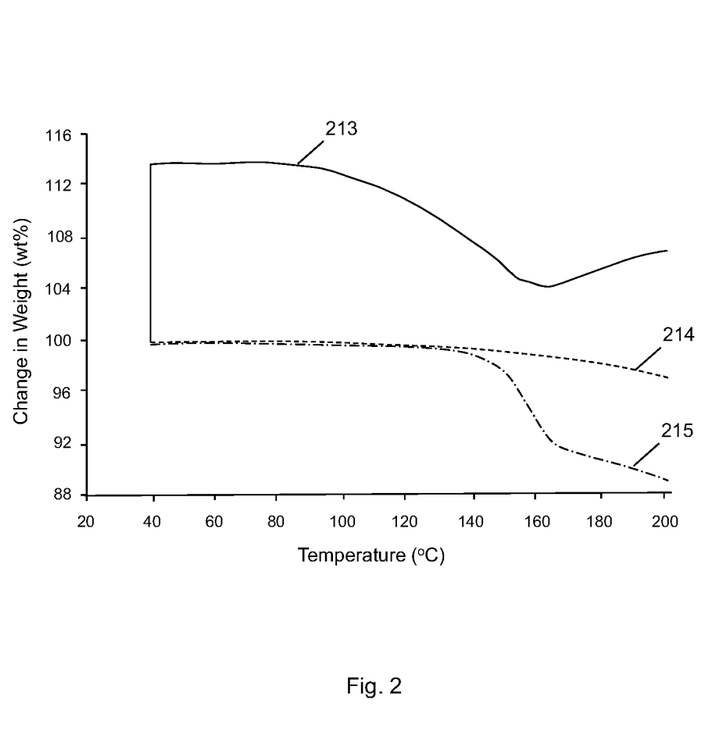
FIG. 2 illustrates the $CO_2$ capacity of an amine-based solid sorbent.

An example of the regeneration under a sweep of $CO_2$ can be seen in FIG. 2. This information was obtained from a thermogravimetric unit and shows the weight change of an immobilized amine plotted versus temperature. The sorbent represented is PEI/silica. Curve 213 shows the quasi-equilibrium results of flowing a pure $CO_2$ stream over the sorbent; curve 214 demonstrates a pure nitrogen stream; and curve 215 represents a stream of air. Under $CO_2$ (curve 213) and at the conditions of absorption (40-60° C.), the sorbent absorbs much $CO_2$. As the regeneration temperature of 105° C. is approached, the sorbent continues to pick up $CO_2$. The difference between the absorption and regeneration is the working capacity and this is small in this temperature range. Note that in a real system where the inlet $CO_2$ concentration is 10-15% rather than pure, the $CO_2$ working capacity would be even lower than as shown in FIG. 2. In order for the $CO_2$ working capacity to become reasonable, a higher temperature is required for regeneration. However, this will now increase the sorbent sensible heating in the regenerative heat duty. Additionally, as seen in the air (curve 215) and nitrogen (curve 214) tests in FIG. 2, as an increase in temperature occurs (>130° C.) the amine stability on the sorbent becomes questionable and an oxidative degradation occurs. Because of similar types of experience with other versions of immobilized amine sorbents, the conclusion is that a direct steam regeneration (low partial pressure of $CO_2$) would be more amenable than a $CO_2$ sweep regeneration (high partial pressure of $CO_2$ with no moisture in the sweep gas).

The behavior of this type of sorbent, for example PEI/silica, can further be exemplified by data for the pressure range that would be found in a typical cyclic operation between absorption and regeneration, if a pure $CO_2$ regeneration is utilized. The inlet partial pressure of $CO_2$ in the flue gas to the absorber would be near 0.14-atm and near 1-atm in the regenerator, if the regenerator has pure $CO_2$ as the sweep gas. If a temperature of 60° C. is maintained in the absorber (near the temperature of the flue gas exiting the FGD scrubber) the capacity of the sorbent is approximately 150 mg $CO_2$/mg sorbent. If regeneration occurs at 100° C. and under pure surroundings of $CO_2$, the capacity of the sorbent is still substantially high, near 150 mg $CO_2$/mg sorbent. Thus the net loading or working capacity is negligible. This further indicates that another technique is needed for regenerating this type of sorbent.

The rationale for attempting to balance or manipulate the water loading on the sorbent as it is transported among the vessels along the sorbent circulation path is based on several considerations. The overall goal is to mitigate any energy losses in the regenerator arising from desorption of water from the sorbent during regeneration, since such losses would raise the regeneration heat duty and increase separation costs. Laboratory experiments have examined the equilibrium loadings on the sorbent for both the absorber and regenerator. Absorption conditions were chosen to simulate those of an actual flue gas exiting a FGD unit in a power plant. Regeneration conditions were chosen to simulate sorbent regeneration using a direct steam sweep gas. Preliminary results have shown that a maximum $H_2O$ capacity of approximately 30 moles/kg can be achieved in the absorber. The sorbent in the regenerator can achieve a maximum $H_2O$ capacity of approximately 15 moles/kg. However, it must be emphasized that these are equilibrium loadings, i.e., there was no restriction on the elapsed time necessary to achieve steady state. The vessels in an actual process would be sized (i.e., for the sorbent residence time in contact with the gas) and restricted to achieve acceptable $CO_2$ loadings in the absorber. In the packed bed experimental studies, the $CO_2$ equilibrium absorption time is much shorter than the $H_2O$ equilibrium absorption time. Therefore, a much lower loading of $H_2O$ exiting the absorber is expected since the residence time will be shorter and tailored to achieve sufficient $CO_2$ loading. A similar logic will be employed for the regenerator, i.e., the vessel's sorbent residence time will be minimized to achieve an acceptable level of $CO_2$ regeneration. However, because the $H_2O$ loadings are mismatched between the absorber and regenerator, a subsequent pass of the sorbent through the vessel in a continuous flow operation is equivalent to adding additional residence time for the sorbent to contact the gas and therefore raise its loading and thus ultimately approach its equilibrium loading. In the absence of manipulating the $H_2O$ loading between the absorber and regenerator, the sorbent could potentially reach its equilibrium value of 30 moles/kg exiting the absorber, providing that the absorber residence time is sufficiently long enough for an additional pickup of 15 moles/kg. Since the sorbent can only hold 15 moles/kg in the regenerator (its equilibrium loading), the sorbent could potentially lose the loading difference (i.e., 30–15=15), again assuming sufficient residence time to achieve equilibrium. Such a loss is to be avoided since it will increase regeneration heat duty.

The insertion of a moisture conditioning device after the regenerator aims to solve the moisture loading imbalance. Heated air passed through the sorbent purges any "free steam" surrounding the sorbent and avoids condensation of the moisture upon cooling the sorbent to return it to the absorber. A secondary consideration of the conditioning device is to further lower the moisture loading on the sorbent exiting the regenerator to a pre-determined value entering the absorber such that the absorber exit moisture level will match the regenerator exit value. Experimental results indicate that the moisture can be readily released under an inert gas flow even without a temperature swing, suggesting that the moisture is weakly bonded. As an example based on preliminary data, assume that the sorbent will absorb 2 moles of $H_2O$ per mole of $CO_2$ absorbed in the absorber for the given residence time per sorbent pass. Typical $CO_2$ loadings are 3 moles/kg, so 6 moles of $H_2O$/kg will be sorbed in the absorber. That implies that the sorbent exiting the conditioner should be dried to a level of 9 moles/kg which then enters the absorber and gains 6 moles/kg upon contact with the flue gas and exits the absorber with a loading of 15 moles/kg. This loading matches the regenerator loading and therefore avoids any additional desorption of moisture.

The moisture conditioning device could presumably be moved inside the regenerator by designing the regenerator residence time accordingly to achieve sufficient desorption of $H_2O$. However, the heating value (and cost to produce) of the sweep gas used to achieve the drying should be considered. This is the underlying premise of minimizing the regenerator heat duty. Steam sweeping the regenerator at 105° C. has a higher enthalpy value than preheated air entering the external conditioning device, so it appears intuitive to favor the use of preheated sweep air in a separate device external to and after the regenerator. Additionally, any water removal from the sorbent in the regenerator will appear in the regenerator off-gas and will be separated from the $CO_2$ in a downstream condenser, further increasing costs.

DESCRIPTION OF AN EMBODIMENT

Figure 3:
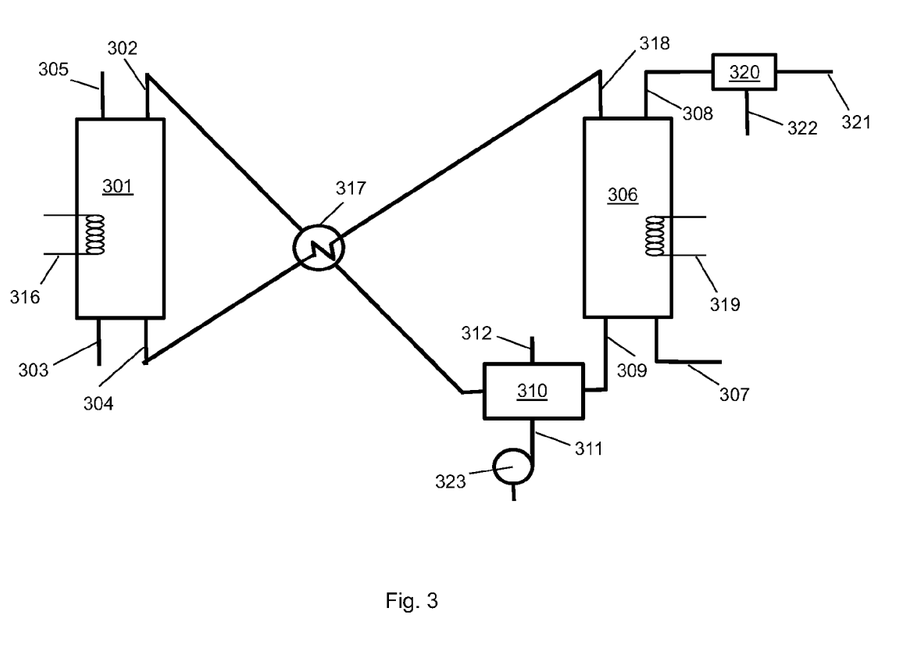
FIG. 3 illustrates a further embodiment of the method disclosed herein employing a direct steam regeneration.

An embodiment utilizing direct steam regeneration is illustrated at FIG. 3. In the embodiment at FIG. 3, the absorption reactor 301 is downstream of a coal-fired power plant and receives flue gas at 303 from an upstream flue gas desulfurization (FGD) unit, for example a wet scrubber or dry scrubber (spray dryer). Similarly, nitric oxides have been removed prior to absorption reactor 301 by selective catalytic reduction (SCR). In any event, the inlet $SO_2$ and NOx are held to a minimum to minimize poisoning of the sorbent, when applicable. The stream entering into absorption reactor 301 is comprised of approximately 15 vol % $H_2O$ and 10-15% $CO_2$, at 14.7 psia and 60° C.

When introduced into absorption reactor 301, $CO_2$ reacts with the amine-based solid sorbent and $H_2O$ may also adsorb onto the sorbent, as discussed previously. Cooling occurs as necessary via heat exchanger 316. The decarbonated flue gas then exits from absorption reactor 301 at 305 and proceeds to a stack. The loaded sorbent containing the reacted $CO_2$ and adsorbed $H_2O$ exits from absorption reactor 301 at 304 and proceeds through cross-flow heat exchanger 317 before proceeding to regeneration reactor 306. Heat exchanger 317 can be a solid-solid heat exchanger where the loaded sorbent from absorption reactor 301 is heated by conditioned sorbent exiting conditioner 310. If direct solid-solid heat exchange is poor, heat exchanger 317 may also employ a secondary working fluid circulated between the two solids process streams to further enhance the heat transfer.

To react the amine-based solid sorbents described in this disclosure with $CO_2$ in a gas stream, heat management must be considered. Relative to trace gas contaminant removal, such as $SO_2$, NOx, and Hg, heat management in a $CO_2$ removal system is more problematic due to the typical higher concentration of $CO_2$ in a flue gas stream. During $CO_2$ absorption, an exothermic reaction occurs and this generated heat must be removed to prevent temperature increases, potential sorbent degradation, and reduced loadings. Similarly during the regeneration step, heat must be added effectively at elevated temperature to regenerate the solid sorbent for a temperature swing regeneration. Heat management may occur through various means known in the art such as heat exchangers and cyclic thermal balancing. For example, proper heat management may be obtained whole or in part by the transport of sorbent to the different reactor vessels between the absorption and regeneration steps. Thus, some form of transport reactor may be utilized in this disclosure, for example, fluidized bed, moving bed, dense-phase transport, etc. These transport reactors can contain heat transfer surfaces within the internals of the reactor to remove heat—as in the case of absorption—or add heat—as in the case of regeneration. These types of reactors can be designed in a conventional manner. Actual transport of the sorbent between the vessels can use bucket elevators, pneumatic lock hoppers, screw feeders, or any other technique that can convey solids around a closed circulation loop.

At FIG. 3, the loaded sorbent then enters regeneration reactor 306 at 318. Within regeneration reactor 306, the loaded sorbent is directly contacted with steam regenerant entering regeneration reactor 306 at 307. Low pressure steam extracted from before the low pressure steam cycle in a power generation scheme can be used. The temperature of the steam can be as low as 105° C., slightly superheated at ambient pressure, or greater. The steam is at the correct temperature so that moisture will not condense on the sorbent within regeneration reactor 306, and the steam must provide the heat of regeneration for the loaded sorbent. Some degree of superheating the steam may be required to prevent condensation.

Additionally, although the case exists where all of the heat of regeneration may be provided by a direct sweep of steam, in an embodiment only a fraction of the heat of regeneration is provided by a direct sweep of steam, and the remaining heat requirement is provided by indirect steam heating through heat exchanger 319. Much more heat can be transferred in the indirect steam case by condensing the steam and thereby utilizing the latent heat of vaporization. However, any condensing steam must be contacted indirectly with the sorbent to avoid liquid water depositing on the sorbent and potentially degrading it.

Within regeneration reactor 306, a temperature swing/$CO_2$ pressure swing is utilized to regenerate the loaded sorbent. Steam is used as the regenerant. In this thermal swing regeneration, a gas stream comprised of $CO_2$ and moisture exits regeneration reactor 306 at 308, and cooler 320 condenses the moisture from the stream and produces a $CO_2$ stream 321 and an $H_2O$ stream 322. The $CO_2$ stream is relatively pure and may undergo sequestration or further utilization.

The regenerated sorbent exits regeneration reactor 306 at 309. The regenerated sorbent leaving regeneration reactor 306 will have been exposed to steam and precaution may be needed to prevent condensation of moisture onto the regenerated sorbent upon cooling. After exiting regeneration reactor 306 and preferably immediately following the regeneration, the regenerated sorbent enters conditioner 310 and is exposed to a small flow of ambient air entering conditioner 310 at 311 and exiting at 312. The small flow of air is motivated by blower 323 and possibly heated. This will shift the free steam concentration surrounding the sorbent to a lower value to prevent condensation of moisture on the sorbent downstream during the cooling process. The flow of air further generates an $H_2O$ pressure swing step where the sorbent is exposed to a small stream of air to drive off some of the moisture and partially cool the sorbent.

Calculations reveal that for a small temperature drop (about 8° F.) and pressure drop across the unit (5 psi), the parasitic power for compression is less than 1 MW. It is assumed that a 500-MWe power plant is the baseline producing 750,000 lb $CO_2$/hr; the temperature of the sorbent changes from 220° F. to 212° F.; the $CO_2$ loading capacity of the sorbent is 3 mol/kg; the $H_2O$ loading capacity of the sorbent is 15 mol/kg; ambient air is 77° F.; and isothermal compression of air is conducted. An energy balance across the conditioner yields that less gas is required as the temperature of the gas exiting the conditioner approaches the temperature of the sorbent. For a conservative air exit gas temperature of 120° F., an isothermal compressor at 90% efficiency and with a 2-psia pressure drop across the bed, a parasitic load of 0.35 MW is calculated. Although this parasitic load is certainly not an advantage of the process, this dehumidification step may be required to maintain the performance of the sorbent. Ideally after this step, the sorbent will be free of any residual $CO_2$, and the $H_2O$ loading will be fashioned to balance the water removed in the conditioner with that adsorbed in the absorber. The $CO_2$ working capacity of the sorbent will be maximized. The sorbent exiting the conditioner would then flow to the heat exchanger where it is cooled to the temperature of absorption and then sent to the absorber.

Figure 4:
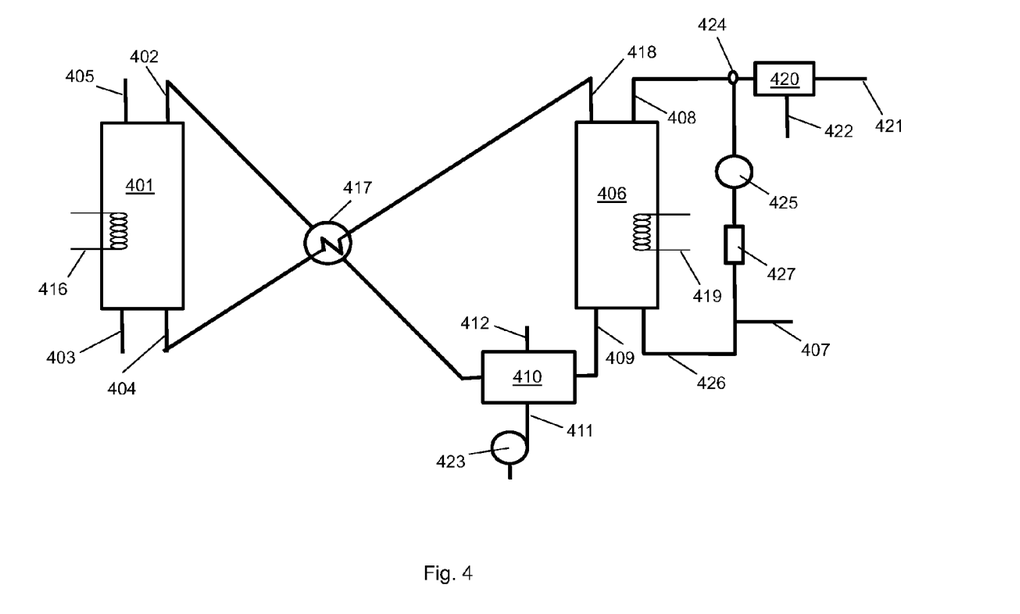
FIG. 4 illustrates a further embodiment of the method disclosed herein employing a $CO_2$ and $H_2O$ regeneration.

Another embodiment utilizing a $CO_2$ and $H_2O$ regeneration stream is illustrated at FIG. 4. FIG. 4 illustrates the absorption reactor 401 receiving a stream entering at 403 and comprised of approximately 15 vol % $H_2O$ and 10-15% $CO_2$, at 14.7 psia and 60° C. $CO_2$ reacts with the amine-based solid sorbent and cooling occurs as necessary via heat exchanger 416. The decarbonated gas then exits at 405. The loaded sorbent at 404 and proceeds through cross-flow heat exchanger 417 before proceeding to regeneration reactor 406. The loaded sorbent enters regeneration reactor 406 at 418.

At FIG. 4, a gas stream comprised of $CO_2$ and moisture exits regeneration reactor 406 at 408, and cooler 420 on the stream condenses the moisture from the stream and produces a $CO_2$ stream 421 and an $H_2O$ stream 422, as before. In this embodiment, however, some products of regeneration are diverted at flow control means 424. This provides a stream of $CO_2$ and possibly $H_2O$ which is motivated by blower 425 and recycled back to regeneration reactor 406, entering at 426. The heat for the regeneration may be provided by direct superheated steam injection into the recycle stream at 407, indirect steam heating of the recycle stream via heat exchanger 427, or a combination thereof. Additionally, as before, indirect steam heating may be employed in regeneration reactor 406 via heat exchanger 419. An advantage of this recycling is that the gaseous moisture content above the sorbent in the regenerator may be tailored to keep the moisture level on the sorbent exiting the regenerator the same as the content on the sorbent within the absorber.

The regenerated sorbent exits regeneration reactor 406 at 409 and enters conditioner 410, where exposure to a small flow of ambient air entering conditioner 410 at 411 and exiting at 412 occurs, motivated by blower 423. Conditioner 410 prevents moisture from condensing on the sorbent and removes some degree of adsorbed water, prior to conditioned sorbent exiting conditioner 410 being cooled in heat exchanger 417.

The amine-based solid sorbent methodology disclosed here can be applied to utilities, boilers, municipal waste incinerators, and others that combust carbon-based materials. Of these post-combustion $CO_2$ capture possibilities, the one that is envisioned to be used frequently would be power plants that can burn pulverized coal or natural gas. These point sources produce a flue gas where $CO_2$ can range from about 10% to 15% by volume.

Gasification processes that change a carbonaceous material into a hydrogen and carbon monoxide mixture (sometimes referred to as synthesis gas or fuel gas) can also use the $CO_2$ capture technology. A water gas shift reaction in the gasification process can change the carbon monoxide to $CO_2$, and $CO_2$ concentrations as high as 40% may be removed using the amine-based solid sorbent methodology disclosed here.

Additionally, any process or gas stream that contains or produces $CO_2$, either as a waste or product could use the technology for concentrating that stream of $CO_2$. Natural gas purification is an example of this. Also, the basis for ambient air $CO_2$ capture systems can be the amine-based solid sorbent methodology disclosed here.

Thus, the disclosure provides a method of adsorbing $CO_2$ using an amine-based solid sorbent whereby regeneration losses and $CO_2$ capacity reductions are mitigated through proper adsorbed water management during the cyclic process.

Further, the disclosure provides a method of adsorbing $CO_2$ using an amine-based solid sorbent whereby the manner in which $H_2O$ and $CO_2$ are sorbed and desorbed, so that vessels sized to achieve acceptable $CO_2$ absorption and regeneration loads can be optimized through the water management.

Further, the disclosure provides a method of adsorbing $CO_2$ using an amine-based solid sorbent whereby substantially equalized absorber and regenerator moisture loadings may result, so that the thermal energy in a steam regeneration process is applied maximally to $CO_2$ desorption, without the necessity for desorbing $H_2O$ adsorbed in the $CO_2$ absorption process.

Further, the disclosure provides a method of adsorbing $CO_2$ using an amine-based solid sorbent where the method can be integrated with existing power or fuel production facilities, in order to provide a relatively pure $CO_2$ stream for subsequent sequestration or utilization.

Further, the disclosure provides a method of adsorbing $CO_2$ using an amine-based solid sorbent where the methodology can be applied to temperature and pressure ranges avoiding oxidative degeneration of the amine-based solid sorbent while minimizing energy and infrastructure impacts.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

TABLE 1

Absorption testing on PEI/PMMA and PEI silica

| Amine-based solid sorbent | Temperature | Gas composition[1] | $CO_2$ Capacity, mol/kg sorbent | $H_2O$ Capacity, mol/kg sorbent |
|---|---|---|---|---|
| PEI/PMMA | 60° C. (140° F.): | 10% $CO_2$ 7.7% $H_2O$ He | 1.9 | 4.4 |
| PEI/PMMA | 60° C. (140° F.): | 10% $CO_2$ 16.5% $H_2O$ He | 1.8 | 14.7 |
| PEI/PMMA | 45° C. (113° F.): | 10% CO2 8.3% $H_2O$ He | 2.4 | 17.8 |
| PMMA only | 60° C. (140° F.): | 10% $CO_2$ 7.9% $H_2O$ He | 0.1 | 3.5 |
| PEI/SILICA: | 60° C. (140° F.): | 10% $CO_2$ He | 3.2 | |
| PEI/SILICA: | 60° C. (140° F.): | 7.9% $H_2O$ He | | 9.0 |
| PEI/SILICA: | 60° C. (140° F.): | 16.5% $H_2O$ He | | 34.8 |
| PEI/SILICA: | 60° C. (140° F.): | 10% $CO_2$ 7.7% $H_2O$ He | 3.3 | 9.6 |
| PEI/SILICA: | 60° C. (140° F.): | 10% $CO_2$ 17.1% $H_2O$ He | 3.3 | 28.7 |
| PEI/SILICA: | 105° C. (221° F.): | 90% $H_2O$ He | | 14.7 |

Note 1:
CO2 percentage expressed on dry basis

What is claimed is:

1. A method of adsorbing $CO_2$ from a gaseous stream comprised of $CO_2$ and $H_2O$ and other components using an amine-based solid sorbent having an initial moisture loading in a cyclic process utilizing steam regeneration, comprising: adsorbing $CO_2$ by exposing the amine-based solid sorbent having the initial moisture loading to the gaseous stream comprised of $CO_2$ and $H_2O$ and other components, and adsorbing $CO_2$ and $H_2O$ from the gaseous stream on at least a portion of the amine-based solid sorbent, thereby producing a loaded sorbent having an adsorption moisture loading, where the adsorption moisture loading is greater than the initial moisture loading by an adsorption amount, and transferring heat from the amine-based solid sorbent and the loaded sorbent to maintain the amine-based solid sorbent and the loaded sorbent at a first temperature, and separating the loaded sorbent from the gaseous stream; regenerating the loaded sorbent by exposing the loaded sorbent to a flow of regeneration steam and transferring heat from the flow of regeneration steam to the loaded sorbent, where the flow of regeneration steam is at a second temperature greater than the first temperature, thereby increasing the temperature of the loaded sorbent to a third temperature greater than the first temperature, where the third temperature is greater than the condensation temperature of $H_2O$, such that the loaded sorbent desorbs at least some portion of the $CO_2$ adsorbed on the loaded sorbent, thereby producing a regenerated sorbent having a regeneration moisture loading; separating the regenerated sorbent from the flow of regeneration steam and maintaining the temperature of the regenerated sorbent above the condensation temperature of $H_2O$; conditioning the regenerated sorbent by exposing the regenerated sorbent to a flow of a drying gas at a drying temperature, where the drying temperature is sufficient to maintain the temperature of the regenerated sorbent above the condensation temperature of $H_2O$ under the conditions of the flow of the drying gas, thereby removing gaseous moisture surrounding the regenerated sorbent and producing a conditioned sorbent, and maintaining the exposure to the flow of drying gas until the conditioned sorbent has a conditioned moisture loading, where the conditioned moisture loading is less than the adsorption moisture loading by the adsorption amount, and cooling the conditioned sorbent to the first temperature; and repeating the adsorbing step, the regenerating step, the separating, and the conditioning step using the conditioned sorbent as the amine-based solid sorbent, thereby adsorbing $CO_2$ from the gaseous stream comprised of $CO_2$ and $H_2O$ and other components using the amine-based solid sorbent having the initial moisture loading in the cyclic process utilizing steam regeneration.

2. The method of claim 1 where the adsorption moisture loading is substantially equivalent to the regeneration moisture loading.

3. The method of claim 1 including additionally transferring heat in the regenerating step with an indirect heat transfer from a second flow of steam in order to increase the temperature of the loaded sorbent to the third temperature.

4. The method of claim 1 where the drying gas is comprised of air.

5. The method of claim 1 where the adsorbing step occurs in an adsorption reactor, and where the regenerating step occurs in a regeneration reactor, and the conditioning step occurs in a conditioner, and including transferring the loaded sorbent from the adsorption reactor to the regeneration reactor, transferring the regenerated sorbent from the regeneration reactor to the conditioner, and transferring the conditioned sorbent from the conditioner to the adsorption reactor.

6. The method of claim 5 where cooling the conditioned sorbent to the first temperature is accomplished at least in part by transferring heat from the conditioned sorbent to loaded sorbent.

7. The method of claim 5 including withdrawing an exhaust stream from the adsorption reactor, where the exhaust stream is comprised of the gaseous stream less the $CO_2$ and $H_2O$ adsorbed by the amine-based solid sorbent, and including withdrawing a $CO_2$ stream from the regeneration reactor, where the $CO_2$ stream is comprised of $CO_2$ desorbed from the loaded sorbent and some portion of steam from the flow of regeneration steam.

8. The method of claim 7 including cooling the $CO_2$ stream and condensing at least a portion of the some portion of steam to produce a liquid water, and separating the $CO_2$ stream into an $H_2O$ stream and a $CO_2$ storage stream, where the $H_2O$ stream is comprised of the liquid water and the $CO_2$ storage stream is comprised of the $CO_2$ stream less the liquid water.

9. The method of claim 7 including diverting a portion of the $CO_2$ stream to produce a recirculation stream, and directing the recirculation stream to the regeneration reactor.

10. The method of claim 5 where the gaseous stream is flue gas from a power plant producing power plant steam and where the regeneration steam is comprised of a portion of the power plant steam, and where the adsorption reactor and the regeneration reactor have a total pressure substantially equivalent to atmospheric pressure, and where the second temperature is less than 150° C.

11. The method of claim 10 including scrubbing the flue gas for sulfur dioxide and nitric oxides removal prior to exposing the amine-based solid sorbent to the flue gas.

12. A method of adsorbing $CO_2$ from a gaseous stream comprised of $CO_2$ and $H_2O$ and other components using an amine-based solid sorbent having an initial moisture loading in a cyclic process utilizing steam regeneration, comprising: adsorbing $CO_2$ by exposing the amine-based solid sorbent having the initial moisture loading to the gaseous stream comprised of $CO_2$ and $H_2O$ and other components in an adsorption reactor, and adsorbing $CO_2$ and $H_2O$ from the gaseous stream on at least a portion of the amine-based solid sorbent, thereby producing a loaded sorbent having an adsorption moisture loading, where the adsorption moisture loading is greater than the initial moisture loading by an adsorption amount, and transferring heat from the adsorption reactor to maintain the amine-based solid sorbent and the loaded sorbent at a first temperature; separating the loaded sorbent from the gaseous stream and transferring the loaded sorbent from the adsorption reactor to a regeneration reactor; regenerating the loaded sorbent by exposing the loaded sorbent to a flow of regeneration steam in the regeneration reactor and transferring heat from the flow of regeneration steam to the loaded sorbent, where the flow of regeneration steam is at a second temperature greater than the first temperature, thereby increasing the temperature of the loaded sorbent to a third temperature greater than the first temperature, where the third temperature is greater than the condensation temperature of $H_2O$, such that the loaded sorbent desorbs at least some portion of the $CO_2$ adsorbed on the loaded sorbent, thereby producing a regenerated sorbent having a regeneration moisture loading; separating the regenerated sorbent from the flow of regeneration steam and transferring the regenerated sorbent from the regeneration reactor to a conditioner, and maintaining the temperature of the regenerated sorbent above the condensation temperature of $H_2O$ during the transfer; conditioning the regenerated sorbent by exposing the regenerated sorbent to a flow of a drying gas at a drying temperature in the conditioner, where the drying temperature is sufficient to maintain the temperature of the regenerated sorbent above the condensation temperature of $H_2O$ under the conditions of the flow of the drying gas, thereby removing gaseous moisture surrounding the regenerated sorbent and producing a conditioned sorbent, and maintaining the exposure to the flow of drying gas until the conditioned sorbent has a conditioned moisture loading, where the conditioned moisture loading is less than the adsorption moisture loading by the adsorption amount; transferring the conditioned sorbent from the conditioner and transferring heat from the conditioned sorbent to loaded sorbent, and cooling the conditioned sorbent to the first temperature; and repeating the adsorbing step, the separating the loaded sorbent step, the regenerating step, the separating the regenerated sorbent step, the conditioning step, and the transferring the conditioned sorbent step, using the conditioned sorbent as the amine-based solid sorbent, thereby adsorbing $CO_2$ from the gaseous stream comprised of $CO_2$ and $H_2O$ and other components using the amine-based solid sorbent having the initial moisture loading in the cyclic process utilizing steam regeneration.

13. The method of claim 12 where the adsorption moisture loading is substantially equivalent to the regeneration moisture loading.

14. The method of claim 13 including withdrawing an exhaust stream from the adsorption reactor, where the exhaust stream is comprised of the gaseous stream less the $CO_2$ and $H_2O$ adsorbed by the amine-based solid sorbent, and including withdrawing a $CO_2$ stream from the regeneration reactor, where the $CO_2$ stream is comprised of $CO_2$ desorbed from the loaded sorbent and some portion of steam from the flow of regeneration steam.

15. The method of claim 14 including cooling the $CO_2$ stream and condensing at least a portion of the some portion of steam to produce a liquid water, and separating the $CO_2$ stream into an $H_2O$ stream and a $CO_2$ storage stream, where the $H_2O$ stream is comprised of the liquid water and the $CO_2$ storage stream is comprised of the $CO_2$ stream less the liquid water.

16. The method of claim 15 where the gaseous stream is flue gas from a power plant producing power plant steam and where the regeneration steam is comprised of a portion of the power plant steam, and where the adsorption reactor and the regeneration reactor have a total pressure substantially equivalent to atmospheric pressure, and where the second temperature is less than 135° C., and where the drying gas is air.

17. The method of claim 15 including diverting a portion of the $CO_2$ stream to produce a recirculation stream, and directing the recirculation stream to the regeneration reactor.

18. The method of claim 15 including additionally transferring heat in the regenerating step with an indirect heat transfer from a second flow of steam in order to increase the temperature of the loaded sorbent to the third temperature.

19. A method of adsorbing $CO_2$ from a gaseous stream comprised of $CO_2$ and $H_2O$ and other components using an amine-based solid sorbent having an initial moisture loading in a cyclic process utilizing steam regeneration, where the gaseous stream is flue gas from a power plant producing power plant steam, comprising: adsorbing $CO_2$ by exposing the amine-based solid sorbent having the initial moisture loading to the gaseous stream comprised of $CO_2$ and $H_2O$ in an adsorption reactor, and adsorbing $CO_2$ and $H_2O$ from the gaseous stream on at least a portion of the amine-based solid sorbent, thereby producing a loaded sorbent having an adsorption moisture loading, where the adsorption moisture loading is greater than the initial moisture loading by an adsorption amount, and transferring heat from the adsorption reactor to maintain the amine-based solid sorbent and the loaded sorbent at a first temperature; separating the loaded sorbent from the gaseous stream and transferring the loaded sorbent from the adsorption reactor to a regeneration reactor, and withdrawing an exhaust stream from the adsorption reactor, where the exhaust stream is comprised of the gaseous stream less the $CO_2$ and $H_2O$ adsorbed by the amine-based solid sorbent; regenerating the loaded sorbent by exposing the loaded sorbent to a flow of regeneration steam in the regeneration reactor, where the regeneration steam is comprised of a portion of the power plant steam, and transferring heat from the flow of regeneration steam to the loaded sorbent, where the flow of regeneration steam is at a second temperature greater than the first temperature, thereby increasing the temperature of the loaded sorbent to a third temperature greater than the first temperature, where the third temperature is greater than the condensation temperature of $H_2O$, such that the loaded sorbent desorbs at least some portion of the $CO_2$ adsorbed on the loaded sorbent, thereby producing a regenerated sorbent having a regeneration moisture loading; separating the regenerated sorbent from the flow of regeneration steam and transferring the regenerated sorbent from the regeneration reactor to a conditioner, and maintaining the temperature of the regenerated sorbent above the condensation temperature of $H_2O$ during the transfer, and withdrawing a $CO_2$ stream from the regeneration reactor, where the $CO_2$ stream is comprised of $CO_2$ desorbed from the loaded sorbent and some portion of steam from the flow of regeneration steam; conditioning the regenerated sorbent by exposing the regenerated sorbent to a flow of air at a drying temperature in the conditioner, where the drying temperature is sufficient to maintain the temperature of the regenerated sorbent above the condensation temperature of $H_2O$ under the conditions of the flow of air, thereby removing gaseous moisture surrounding the regenerated sorbent and producing a conditioned sorbent, and maintaining the exposure to the flow of drying gas until the conditioned sorbent has a conditioned moisture loading, where the conditioned moisture loading is less than the adsorption moisture loading by the adsorption amount, and where the adsorption amount is such that the adsorption moisture loading is substantially equivalent to the regeneration moisture loading; transferring the conditioned sorbent from the conditioner and transferring heat from the conditioned sorbent to loaded sorbent, and cooling the conditioned sorbent to the first temperature; and repeating the adsorbing step, the separating the loaded sorbent step, the regenerating step, the separating the regenerated sorbent step, the conditioning step, and the transferring the conditioned sorbent step, using the conditioned sorbent as the amine-based solid sorbent, thereby adsorbing $CO_2$ from the gaseous stream comprised of $CO_2$ and $H_2O$ and other components using the amine-based solid sorbent having the initial moisture loading in the cyclic process utilizing steam regeneration.

20. The method of claim 19 including diverting a portion of the $CO_2$ stream to produce a recirculation stream, and directing the recirculation stream to the regeneration reactor.

\* \* \* \* \*